July 29, 1958     O. J. BRUUN     2,845,209
CUP-SHAPED CAPSULES
Filed Oct. 29, 1954
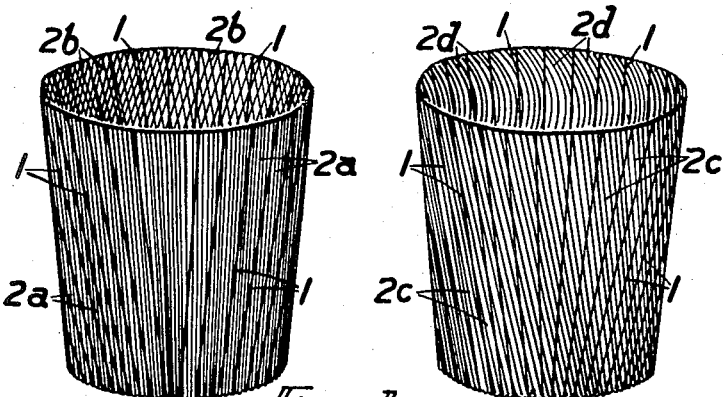
Fig. 1.
Fig. 2.
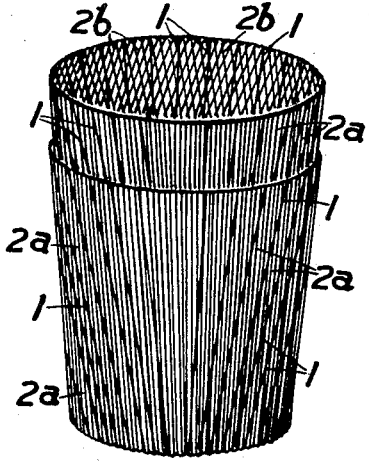
Fig. 3.
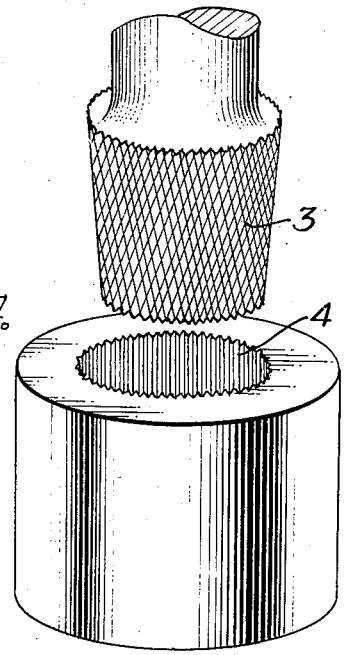
Fig. 4.
Fig. 5.
INVENTOR
Otto Johannes Bruun
BY D. Malcolm
ATTORNEY

United States Patent Office 2,845,209
Patented July 29, 1958

2,845,209
CUP-SHAPED CAPSULES

Otto Johannes Bruun, Slough, England

Application October 29, 1954, Serial No. 465,667

Claims priority, application Great Britain December 22, 1953

4 Claims. (Cl. 229—4.5)

The present invention relates to cup-shaped capsules of the kind which are made from thin pliable foil such as metal foil. Such capsules are sometimes made by forming a flat metal blank of foil into cup shape with pleated side folds which are compressed and flattened to overlap each other, but the capsules may also be made with smooth sides by spinning or drawing and the present invention is applicable to both kinds.

In my prior Patent No. 2,641,402 cup-shaped foil capsules with pleated side folds are described, having impressed in the sides thereof a pattern of indentations. This has the effect of interlocking the overlapping side folds together, and it also has the effect of adding stiffness to the side walls of the capsule.

The pattern of indentations when impressed as described in said Patent No. 2,641,402, is the same on both surfaces of the side walls, except that it is concave on the one surface where it is convex on the other, and vice versa, and this has the disadvantage that, when the capsules are nested together in stacks, the pattern on the outer surface of one capsule will mate with the pattern on the inner surface of its neighbour. The juxtaposition of the nested walls will be very intimate with hardly any airspace between the capsules and the free protruding edges of the capsules will be narrow which together tends to make the separation of the capsules from the stack difficult.

This was not of great consequence when the separation of the capsules was effected manually, but the demand for high speed productivity has necessitated the employment of automatic devices for separating the capsules, such as the device described in copending application Serial No. 251,928, filed October 18, 1951, now Patent No. 2,738,899, and this makes it imperative that the capsules shall come apart from one another easily and the distance between the capsules in the stack be sufficient to provide a good grip of the separating means.

The present invention has for its object the provision of a capsule which has the advantages afforded by the pattern of indentations, i. e. added rigidity and (in the case where the capsule has pleated side folds) a locking of the side folds together, and at the same time when nested together has increased air space between the capsules, a wider free edge of each capsule and avoids the disadvantage of the intimate nesting of the indented pattern of the juxtaposed sidewalls.

The invention consists broadly of a cup-shaped capsule of soft metal foil, wherein one pattern of indentations is impressed on the outer surface of the capsule and a different pattern of indentations is impressed on the inner surface of the capsule.

In order that the invention may be the more clearly understood reference is made to the accompanying drawings wherein:

Figure 1 is a perspective view of a capsule in accordance with the invention,

Figure 2 is a perspective view of another capsule in accordance with the invention, Figure 3 is a perspective view showing two of the capsules of Figure 1 nested together, Figure 4 is a perspective view illustrating one form of apparatus by which the indentations may be impressed into the side walls of the capsule, Fig. 5 is a horizontal cross-section through the wall of the capsule of Fig. 1 with this wall in a flat condition.

Referring to Figure 1, this shows an embodiment of the invention in which a capsule with pleated side walls folded at 1 has its outer surface impressed with a plurality of narrow grooves 2a in line with the generatrix of the capsule and therefore intersecting the fold lines 1, and has its inner surface impressed with two sets of parallel grooves 2b which cross each other.

Figure 2 shows a similar type of capsule to that of Figure 1, but in which the outside surface is impressed with grooves 2c which are inclined to the generatrix in such a direction as to increase their angle to the fold lines 1, and the inner surface is impressed with grooves 2d which are given a wavy form as shown.

The grooves 2a, 2b, 2c and 2d of the present invention have the same advantages as the grooves 2 of said Patent No. 2,641,402, in that they lock the side fold together, and they also have the advantage of affording added rigidity to the side walls. They do not have the disadvantage, however, that, when the capsules are nested, the patterns mate with each other and thereby render the capsules difficult to separate. The consequence is that the capsules according to the present invention are easy to separate by automatic means. It will be noted from Figure 3 that when the capsules are nested that the tops of the outer grooves abut against the tops of the inner grooves provided that the pattern of the outer and inner grooves is different and does not mate which in the first place increases the air space between the capsule walls and secondly increases the width of the protruding rims of the capsules. These two features are of particular value if the capsules are to be separated one by one from the stack by automatic apparatus, for instance according to copending application Serial No. 251,928, filed October 18, 1951, now Patent No. 2,738,899, which separates the capsules by forcing air between them and requires a fairly wide free rim of the capsule for the air to attack in order to prevent more than one capsule to be separated at a time.

Figure 3 illustrates two nesting capsules similar to that of Figure 1 of the present specification and shows how, owing to the inability of the patterns to mate, the inner capsule cannot sink far into the outer capsule and the protruding rim is wide.

Referring to Figure 4, this illustrates a punch 3 and a corresponding die 4 of hard material by which the grooves 2a and 2b of the capsule of Figure 1 may be formed. The punch 3 is shaped so that the capsule fits snugly over it, and the die 4 is shaped to correspond. The punch has its external periphery formed with a pattern of cross ridges corresponding to the crossed grooves required in the inner surface of the capsule, and the die has its internal periphery formed a pattern of ridges corresponding to the grooves required in the outer surface of the capsule.

In operation the ungrooved capsule is fitted over the punch 3 and the latter is pressed into the die. Obviously punches and dies can be adapted for any other pattern required.

The metal of which the capsules are formed must be sufficiently soft to take the impress of the patterns of grooves on the inner and outer surfaces respectively.

1. A cup-shaped capsule of soft metal foil, wherein on pattern of indentations consisting of narrow grooves is impressed on the outer surface of the capsule and a different pattern of indentations consisting of narrow grooves is impressed on the inner surface of the capsule in which the lines of one pattern cross those of the other pattern, whereby intimate nesting of stacked capsules one within the other is avoided.

2. A capsule according to claim 1, wherein the grooves on one surface are in the line of the generatrix of the capsule and the grooves of the other surface are in two parallel sets which intersect each other.

3. A capsule according to claim 1, wherein the grooves on one surface are parallel and inclined to the generatrix of the capsule and the grooves of the other surface are of wavy formation.

4. A capsule according to claim 1, and which has pleated side walls consisting of compressed overlapping layers of the foil, wherein the impressed grooves intersect the fold lines of the pleats and are closer interspaced than said fold lines.

References Cited in the file of this patent

UNITED STATES PATENTS

| | | |
|---|---|---|
| 1,238,092 | Blass | Aug. 28, 1917 |
| 1,977,022 | Swift | Oct. 16, 1934 |
| 2,563,352 | Morse | Aug. 7, 1951 |
| 2,641,402 | Brunn | June 9, 1953 |
| 2,738,914 | Hatch | Mar. 20, 1956 |

FOREIGN PATENTS

| | | |
|---|---|---|
| 468,124 | Canada | Sept. 18, 1950 |